UNITED STATES PATENT OFFICE.

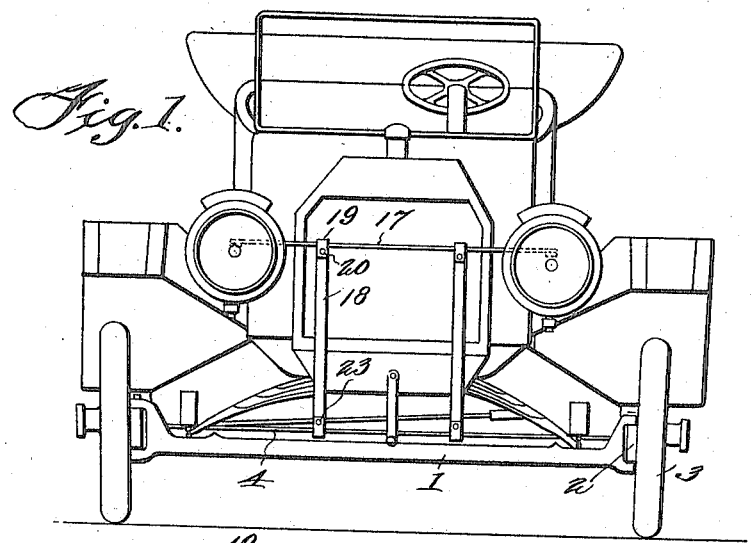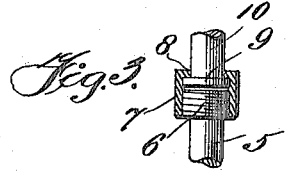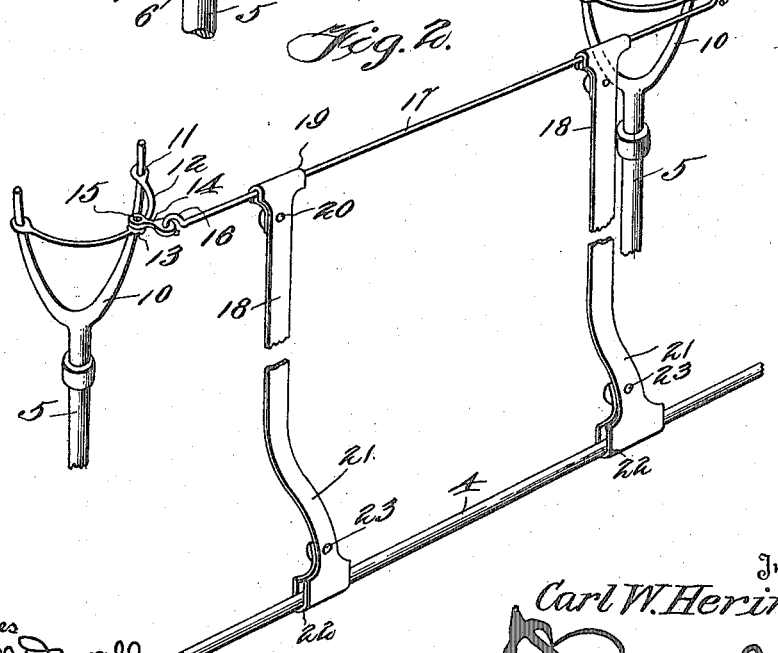

CARL W. HERING, OF BOXFORD, MASSACHUSETTS.

DIRIGIBLE HEADLIGHT.

1,181,765.  Specification of Letters Patent.  Patented May 2, 1916.

Application filed March 5, 1915. Serial No. 12,350.

*To all whom it may concern:*

Be it known that I, CARL W. HERING, a citizen of the United States, residing at Boxford, in the county of Essex and State of Massachusetts, have invented certain new and useful Improvements in Dirigible Headlights; and I do hereby declare the following to be a full, clear, and exact description of the invention, such as will enable others skilled in the art to which it appertains to make and use the same.

This invention relates to new and useful improvements in dirigible headlights and has for its principal object to provide a device which is particularly adapted for use on motor vehicles and the like in order that the lights may be directed in the course which is to be taken, thereby illuminating the way and removing much of the danger accompanying the use of automobiles and the like.

Another object of the invention is to provide a device which is moved simultaneously upon movement of the steering wheel of the vehicle so that a corner cannot be turned without first directing the light in the direction of travel.

A still further object of the invention is to provide a device which may be easily attached to headlights and standards of the usual type without making any material change in the structure thereof.

With these and other objects in view, the invention consists in the novel combination and arrangement of parts which will be fully set forth in the following specification and accompanying drawings, in which:

Figure 1 is a front view in elevation of a motor vehicle showing my improved attachment as it would appear when applied thereto. Fig. 2 is a detail perspective view of the attachment, and Fig. 3 is a sectional view of the upper end of one of the standards showing the method of securing the fork in place.

Referring now to the drawing by characters of reference, the numeral 1 desginates the front axle of a motor vehicle of the usual type provided with the usual knuckles 2 carrying the stub axles on which the wheels 3 are mounted. These knuckles are provided with the usual rearwardly extending arms to which the connecting rod 4 is secured and this connecting rod is used to simultaneously move the wheels upon movement of the steering gear.

The attachment which is best illustrated in Fig. 2 comprises the standards 5 having formed at their upper ends suitable enlargements 6 which are externally screw threaded to receive the socket 7 having the inturned flange 8 formed at its upper end. This inturned flange overlies the collar 9 formed on the stem portion of the fork 10 on which the lamps of the vehicle are mounted. Surrounding the forks are the loops 11, which are connected by the bows 12 and these bows are formed intermediate their ends with the loops 13 to which the plates 14 are pivotally secured as at 15. The rear ends of these links are apertured to receive the eyes 16 formed on the ends of the rod 17 which connect the bows and hold the same in the proper position.

In order that the lamps will be turned upon movement of the connecting rod 4 of the steering gear the stay bands 18 are provided and are formed at their upper ends with the bent back portions 19 which are secured in place by means of bolts or rivets 20. The lower ends of these stay bands are offset as at 21 and formed with the bent back portions 22 which like the bent back portions 19 are held in place by means of the rivets or bolts 23. The bent back portions 19 engage the connecting rod 17 of the lamps while the bent back portions 22 engages the connecting rod 4 of the steering gear. It will thus be seen that when the rod is moved laterally the stay bands 18 will cause the connecting rod 17 to move correspondingly, and thereby throw the beam of light from the headlight in the direction which is to be taken.

It will be apparent from the foregoing that is use the device is connected as shown in Fig. 2 and upon rounding a corner to the left the connecting bar 4 will move to the right and thereby move the rod 17 to the right which will cause the lamps to swing on the pivot bearing fork by the members 6 and 19 and thus swing the lamps into the direction to be taken.

While in the foregoing there has been shown and described the preferred embodiment of this invention, it is to be understood that such changes may be made in the combination and arrangement of parts as will fall within the spirit and scope of the appended claim.

What is claimed is:—

In combination, standards, lamp supports rotatably mounted at the upper ends of the standards, bows connecting the free ends of the arms of the lamp supports, links connected to the bows, a connecting rod connected to the links and holding the same in spaced relation, and means connecting the connecting rod with the steering gear of the vehicle.

In testimony whereof I affix my signature in presence of two witnesses.

CARL W. HERING.

Witnesses:
 FRANK P. RENNICK,
 AUGUST HIMBER.